United States Patent
Matsumoto

(10) Patent No.: US 10,196,576 B2
(45) Date of Patent: Feb. 5, 2019

(54) WATER LUBRICATION TYPE BEARING MATERIAL

(71) Applicant: EAGLE INDUSTRY CO., LTD., Minato-ku, Tokyo (JP)

(72) Inventor: Takanobu Matsumoto, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/542,403

(22) PCT Filed: Jan. 12, 2016

(86) PCT No.: PCT/JP2016/050621
§ 371 (c)(1),
(2) Date: Jul. 7, 2017

(87) PCT Pub. No.: WO2016/114244
PCT Pub. Date: Jul. 21, 2016

(65) Prior Publication Data
US 2017/0362526 A1    Dec. 21, 2017

(30) Foreign Application Priority Data

Jan. 17, 2015  (JP) .................................. 2015-007305

(51) Int. Cl.
*F16C 33/20*    (2006.01)
*C10M 107/38*    (2006.01)
(Continued)

(52) U.S. Cl.
CPC .......... *C10M 107/38* (2013.01); *B63H 23/34* (2013.01); *C08K 7/06* (2013.01); *C08L 27/18* (2013.01);
(Continued)

(58) Field of Classification Search
CPC ....................................................... F16C 33/20
(Continued)

(56) References Cited

U.S. PATENT DOCUMENTS 4,626,365 A * 12/1986 Mori .................... B25D 17/046
508/106
4,655,944 A *  4/1987 Mori ....................... C08L 27/12
428/545

(Continued)

FOREIGN PATENT DOCUMENTS

JP    H05131570 A    5/1993
JP    H07268126 A    10/1995
(Continued)

OTHER PUBLICATIONS

International Search Report (ISR) dated Mar. 29, 2016, issued for International application No. PCT/JP2016/050621.

*Primary Examiner* — Ellen M McAvoy
(74) *Attorney, Agent, or Firm* — Law Office of Katsuhiro Arai

(57) ABSTRACT

A water lubrication type bearing material contains 12 wt. % to 25 wt. % of a tetrafluoroethylene-perfluoroalkyl vinyl ether copolymer resin (PFA resin), 18 wt. % to 33 wt. % of a carbon fiber, and a remainder including a polytetrafluoroethylene (PTFE) resin and/or a modified PTFE resin. The bearing material has excellent wear resistance and sliding characteristics for a water lubrication type bearing.

14 Claims, 4 Drawing Sheets

SPECIFIC WEAR AMOUNT [JISK7218A]

(51) Int. Cl.
  B63H 23/34    (2006.01)
  C08K 7/06     (2006.01)
  C08L 27/18    (2006.01)
  F16C 17/14    (2006.01)
  C10M 125/02   (2006.01)
  C10M 147/04   (2006.01)
  C10M 169/04   (2006.01)
  F16C 33/66    (2006.01)

(52) U.S. Cl.
  CPC ........ *C10M 125/02* (2013.01); *C10M 147/04* (2013.01); *C10M 169/044* (2013.01); *F16C 17/14* (2013.01); *F16C 33/201* (2013.01); *F16C 33/6692* (2013.01); *C10M 2201/041* (2013.01); *C10M 2213/06* (2013.01); *C10M 2213/0623* (2013.01); *C10N 2230/06* (2013.01); *C10N 2240/02* (2013.01); *C10N 2250/08* (2013.01); *F16C 2210/10* (2013.01); *F16C 2326/30* (2013.01)

(58) Field of Classification Search
  USPC .................................................. 508/100–109
  See application file for complete search history.

(56) References Cited

U.S. PATENT DOCUMENTS

| | | | | |
|---|---|---|---|---|
| 5,364,682 A | * | 11/1994 | Tanaka | F16C 33/201 384/908 |
| 5,401,574 A | * | 3/1995 | Masutani | C08K 9/06 277/938 |
| 5,780,396 A | * | 7/1998 | Tanaka | B32B 15/08 508/104 |
| 5,821,204 A | * | 10/1998 | Kato | C08K 3/04 508/106 |
| 5,906,967 A | * | 5/1999 | Kato | C08L 27/18 508/106 |
| 5,998,339 A | * | 12/1999 | Kato | F16C 33/201 508/106 |
| 6,255,380 B1 | * | 7/2001 | Oki | C08K 7/04 428/688 |
| 2006/0177164 A1 | | 8/2006 | Barron et al. | |
| 2007/0232502 A1 | * | 10/2007 | Tsutsui | C08J 9/40 508/104 |
| 2012/0101011 A1 | * | 4/2012 | Makino | C10M 125/00 508/100 |
| 2015/0093595 A1 | * | 4/2015 | Asakawa | C10M 107/38 428/640 |
| 2015/0307800 A1 | * | 10/2015 | Yoshida | F16C 33/201 508/106 |

FOREIGN PATENT DOCUMENTS

| | | |
|---|---|---|
| JP | H09157532 A | 6/1997 |
| JP | H10184692 A | 7/1998 |
| JP | H10204282 A | 8/1998 |
| JP | 2000055054 A | 2/2000 |
| JP | 2001124070 A | 5/2001 |
| JP | 2002327750 A | 11/2002 |
| JP | 2005511980 A | 4/2005 |
| JP | 2007247478 A | 9/2007 |
| JP | 2008202649 A | 9/2008 |
| JP | 2009257590 A | 11/2009 |
| JP | 2010007805 A | 1/2010 |
| JP | 2010159808 A | 7/2010 |
| JP | 2013007006 A | 1/2013 |

\* cited by examiner

WATER LUBRICATION TYPE BEARING MATERIAL

This application is the U.S. National Phase under 35 U.S.C. § 371 of International Application PCT/JP2016/050621, filed Jan. 12, 2016, which claims priority to Japanese Patent Application No. 2015-007305, filed Jan. 17, 2015. The International Application was published under PCT Article 21(2) in a language other than English.

TECHNICAL FIELD

The present invention relates to a slide bearing material, particularly to a water lubrication type bearing material for a ship stern tube, specifically to a water lubrication type bearing material composed of a resin composition prepared by blending a carbon fiber in a resin raw material made of a PTFE or modified PTFE resin, and a PFA resin.

BACKGROUND ART

A slide bearing is roughly classified, according to its lubrication type, into a non-lubrication type, a solid lubrication type, and a fluid lubrication type, and the fluid lubrication type is further classified into a water (seawater or fresh water) lubrication type bearing and an oil lubrication type bearing. When the oil lubrication type bearing is used, friction, wear, and seizure can be prevented to some extent by forming a stable oil film on a sliding surface of bearing by a lubricating oil blended with a friction modifier, a viscosity modifier, and the like. On the other hand, the water lubrication type bearing tends to cause severe wear and seizure at a sliding surface due to a direct contact with a counterpart material, since a kinematic viscosity of water serving as a lubricant is much lower than that of lubricating oil. Thus, superior sliding characteristics such as wear resistance are required in the water lubrication type bearing material.

As such, the oil lubrication type bearing was mostly used in the past, however recently there is an increasing need of adopting the water lubrication type bearing in order to prevent environmental pollution in rivers and oceans caused by outflow of the lubricating oil from the bearing. For example, the oil lubrication type bearing is used as a bearing of water turbine, such as a water turbine for hydraulic power generation in the river, pollution of the river caused by outflow of the lubricating oil is becoming a problem. Further, the oil lubrication type bearing is used as a stern tube bearing that supports a propeller shaft in a ship stern tube or a stern tube shaft in a multiple screw ship, pollution of the ocean caused by outflow of the lubricating oil is becoming a problem.

A resin material that is developed for using in a sliding surface of the water lubrication type bearing and thus excellent in water resistance, self-lubricating property, and wear resistance includes a polyurethane resin material to which polyethylene wax is added (Patent Document 1), a thermoplastic resin material such as a polyetheretherketone resin (Patent Document 2), a carbon fiber-containing polyphenylene sulfide (PPS) resin material (Patent Documents 3 to 6), as well as resin materials, such as nitrile-based rubber, ultra high polymer polyethylene (PE), crosslinked PE, polypropylene (PP), and the like (Patent Document 7).

On the other hand, a polytetrafluoroethylene (PTFE) resin is excellent in self-lubricating property, heat resistance, corrosion resistance, as well as processing property. Thus, a carbon fiber (CF)-containing PTFE resin, of which wear resistance is improved by including a carbon fiber (CF), is used as various bearing materials.

However, the PTFE resin material has low wear resistance as compared to the above resin materials. Thus, even if CF is added as a filler, the PTFE resin material is not good enough as a resin material for water lubrication type bearing serving under a severe condition. An embodiment of using a CF-containing PTFE resin has been described (Patent Document 8), however such a resin is used under a special condition where a sliding surface of fixed member as a counterpart material is formed with a titanium nitride (TiN) film.

Further, it has been reported that a resin composition prepared by blending a resin material made primarily of PTFE with a carbon fiber (CF), molybdenum sulfide, a granular inorganic filler having an average particle size of 1 to 50 µm or a whisker having Mohs hardness of 4 or less is used as an impregnation coating composition for a bronze powder layer formed on a porous stainless steel surface of non-circulation type multilayer bearing material (Patent Documents 9 to 11). However, the resin composition requires blending of a solid lubricant such as a granular mineral and the like including molybdenum sulfide and the like, and is used as an impregnation resin composition for the bronze powder layer on the porous surface of the multilayer bearing. Thus, this resin composition is not intended to be singularly used to form a bearing sliding surface.

Therefore, it has been desired to provide a CF-containing PTFE resin composition, which can sufficiently prevent self wear and exhibit excellent sliding characteristics, when used as a sliding bearing material, particularly as a water lubrication type bearing material such as a stern tube bearing material.

CITATION LIST

Patent Document

Patent Document 1: JP 2013-7006 A
Patent Document 2: JP 2001-124070 A
Patent Document 3: JP 2010-7805 A
Patent Document 4: JP 2009-257590 A
Patent Document 5: JP 2008-202649 A
Patent Document 6: JP 2007-247478 A
Patent Document 7: JP 5-131570 A
Patent Document 8: JP 10-184692 A
Patent Document 9: JP 2010-159808 A
Patent Document 10: JP 2002-327750 A
Patent Document 11: JP 2000-55054 A

DISCLOSURE OF THE INVENTION

Problem to be Solved by the Invention

The present invention has been made to cope with the above-described problems and an object of the present invention is to provide a water lubrication type bearing material, particularly a water lubrication type bearing material, which contains a PTFE resin composition having excellent sliding characteristics such as wear resistance and is usable as a water lubricated stern tube bearing material.

Means for Solving Problem

A water lubrication type bearing material of the present invention is a bearing material constituted of a resin composition containing a polytetrafluoroethylene (PTFE) resin or a modified PTFE resin, a carbon fiber (CF), and a tetrafluoroethylene-perfluoroalkyl vinyl ether copolymer resin (PFA). The water lubrication type bearing material of the present invention is characterized by containing a relatively large amount of the PFA and the carbon fiber (CF). The water lubrication type bearing material of the present invention is also characterized by exhibiting sufficient wear resistance without blending a solid lubricant, such as an inorganic filler and molybdenum sulfide, by including a relatively large amount of the PFA and the carbon fiber (CF).

Specifically, the present invention is related to a water lubrication type bearing material containing 13 wt. % to 30 wt. % of the PFA resin, 18 wt. % to 35 wt. % of the carbon fiber, and the remainder including the polytetrafluoroethylene (PTFE) resin and/or the modified PTFE resin.

More specifically, the present invention includes the following embodiments.

[1] A water lubrication type bearing material comprising 12 wt. % to 25 wt. % of a tetrafluoroethylene-perfluoroalkyl vinyl ether copolymer resin (PFA resin), 18 wt. % to 33 wt. % of a carbon fiber, and a remainder including a polytetrafluoroethylene (PTFE) resin and/or a modified PTFE resin.

[2] The water lubrication type bearing material according to the above [1], wherein the carbon fiber is a pitch-based carbon fiber.

[3] The water lubrication type bearing material according to the above [1] or [2], wherein the carbon fiber is a curved/twisted carbon fiber.

[4] The water lubrication type bearing material according to the above [3], wherein a curvature radius of the curved/twisted carbon fiber is in a range of 50 to 1500 μm.

[5] The water lubrication type bearing material according to any one of the above [1] to [4], wherein a length of the carbon fiber is 70 to 200 μm.

[6] The water lubrication type bearing material according to the above [1] to [5], being used as a bearing for water circulation type seal system of ship.

[7] The water lubrication type bearing material according to the above [1] to [6], wherein the modified PTFE is a copolymer of tetrafluoroethylene and an unsaturated compound selected from a group consisting of fluoroalkyl trifluoroethylene, ethylene, and propylene.

[8] The water lubrication type bearing material according to any one of the above [1] to [7], wherein the PFA has a melt flow rate value (MFR) of less than 15g/10min in accordance with ASTMD3307.

[9] The water lubrication type bearing material according to any one of the above [1] to [8], being arranged inside a metallic member.

Effect of the Invention

The water lubrication type bearing material of the present invention is prepared by blending 13 wt. % to 30 wt. % of the PFA resin and 18 wt. % to 35 wt. % of the carbon fiber to the PTFE or the modified PTFE resin, and thus exhibits superior sliding characteristics that include excellent wear resistance, low aggressiveness, and generating a low sliding heat quantity. Further, the water lubrication type bearing material of the present invention contains a relatively large amount of the PFA and the carbon fiber, and thus exhibits excellent wear resistance and sliding characteristics without including a solid lubricant, such as molybdenum sulfide and an inorganic filler. Therefore, it can be used as an excellent bearing material while having a simple composition.

Further, the water lubrication type bearing material of the present invention is excellent not only in wear resistance but also in water resistance, thus it is particularly suitable as a water lubrication type bearing material. Moreover, it is useful as a bearing material for fresh water lubricated seal system of ship.

DESCRIPTION OF EMBODIMENTS

Figure 1:
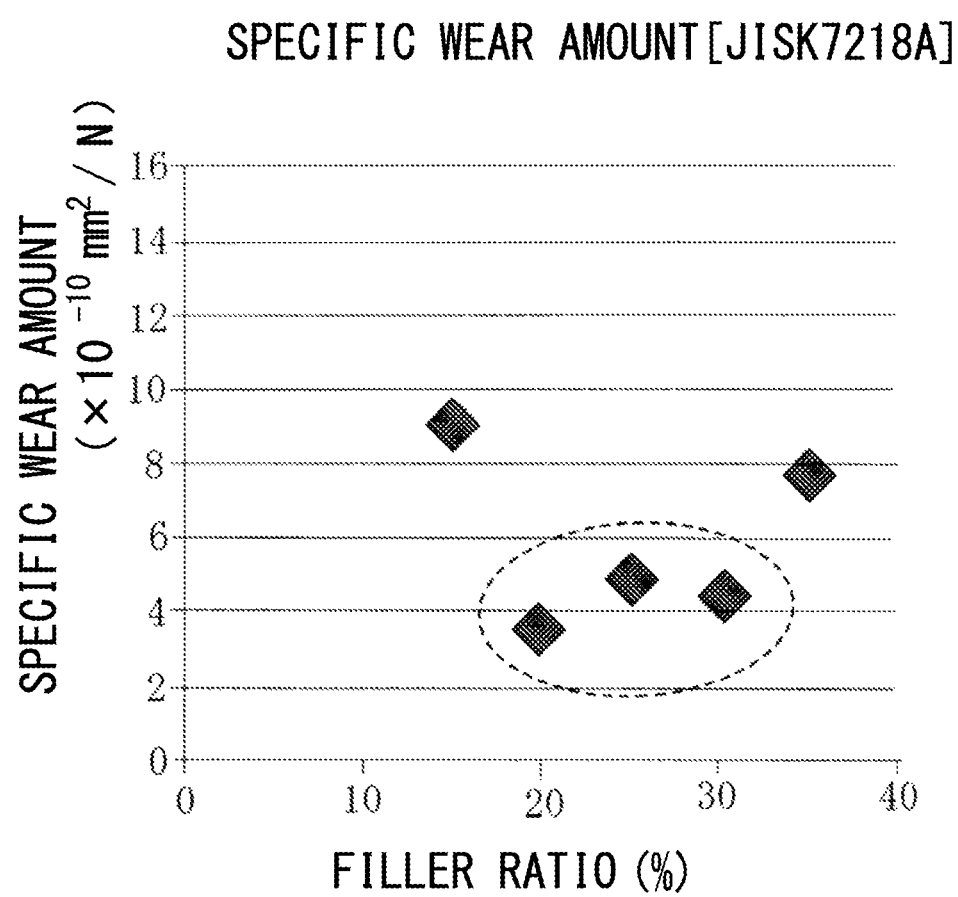
FIG. 1 is a diagram showing measurement results of a specific wear amount (DRY) corresponding to a filler ratio.

As a PTFE resin of the present invention, a common PTFE resin (melting point of 327° C.) represented by "—$(CF_2—CF_2)_n$—" can be used.

As a modified PTFE resin of the present invention, a PTFE copolymer, in which the PTFE is modified with a copolymerizable monomer in an amount of 2 wt. % or less, is used. Examples of such a copolymerizable monomer include a perfluoroalkylether group, a fluoroalkyl group, or other side chain groups containing a fluoroalkyl group. The typical modified PTFE resin can be described as a copolymer of tetrafluoroethylene and an unsaturated compound selected from a group consisting of fluoroalkyl trifluoroethylene, ethylene, and propylene. The modified PTFE resin generally has more excellent compression resistance characteristics than a PTFE resin and thus can be preferably used. It is noted that a common PTFE resin and the modified PTFE resin may be used in combination.

The PTFE resin and the modified PTFE resin have a number average molecular weight (Mn) of preferably about 500,000 to 10,000,000, further preferably 500,000 to 3,000,000. As the PTFE resin available on the market, Teflon (registered trademark) 7J (manufactured by Du Pont-Mitsui Fluorochemicals Co., Ltd.) may be used. Further, examples of the modified PTFE resin available on the market include Teflon (registered trademark) NXT70 (manufactured by Du Pont-Mitsui Fluorochemicals Co., Ltd.), Teflon (registered trademark) TG70J (manufactured by Du Pont-Mitsui Fluorochemicals Co., Ltd.), POLYFLON M111 and POLYFLON M112 (manufactured by Daikin Industries, Ltd.), and Hostaflon TFM1600 and Hostaflon TFM1700 (manufactured by Hoechst AG).

A PFA copolymer resin blended in a PTFE resin raw material is a thermoplastic resin, which has a branch structure. Thus, it has good compatibility with a carbon fiber and exhibits a reinforcing effect to matrix. As a result, blending of the PFA copolymer resin improves wear resistance and reduces counterpart aggressiveness.

In the present invention, the PFA copolymer resin having a lower MFR (melt flow rate) value (measured in accordance with ASTMD3307) (having a higher molecular weight) has better compatibility with the carbon fiber. The PFA copolymer resin has a MFR value of preferably less than 15 g/10 min, more preferably 4 to 8 g/10min, particularly preferably 5 to 7 g/10 min. Specific examples of the PFA resin of the present invention available on the market include ACX21 (manufactured by Daikin Industries, Ltd.).

A blending amount of the PFA copolymer resin is 18 to 30 wt. %, particularly preferably 20 to 25 wt. %, based on the total resin raw material (100 wt. %). When the blending amount is within this range, it is expected that a PTFE product having excellent sliding characteristics and low counterpart aggressiveness can be produced. When the blending amount of the PFA resin is less than 18 wt. %, there is no reinforcing effect to matrix obtained, while when it is more than 30 wt. %, wear resistance is deteriorated with an increase in sliding heat. It is noted that a preferable blending amount of the PFA copolymer resin in the total resin composition is 13 to 30 wt. %, preferably 15 to 23 wt. %, based on 100 wt. % of the total resin composition.

The carbon fiber used in the present invention is a milled fiber obtained by grinding and shortening the carbon fiber. As a milled fiber, a pitch-based short fiber having an average fiber diameter of 5 to 20 μm and an average fiber length of 70 to 200 μm is preferable due to excellent dispersibility in the resin composition. Further, a high-temperature fired product (graphitized product) at a temperature of 2000° C. or higher is more preferably used than a common fired product (carbonized product) at about 1000° C. As the carbon fiber, a pitch-based carbon fiber having an average fiber diameter of 5 to 20 μm and an average fiber length of about 70 to 200 μm is used. A pitch-based, highly graphitized carbon fiber is preferably used. The pitch-based carbon fiber is classified, according to a production raw material thereof, into an optically isotropic pitch and an optically anisotropic pitch (mesophase pitch), but the optically anisotropic pitch (mesophase pitch) has higher strength and elastic force after sizing and is thus preferable as the pitch-based carbon fiber of the present invention.

Further, the carbon fiber in use is not formed in a straight shape, but in a curved/twisted shape having a curvature radius in a range of 50 to 1500 μm. When the curvature radius is less than 50 μm, the carbon fiber is broken in a compression molding process of the PTFE material and the proper fiber length cannot be maintained. When the curvature radius is more than 1500 μm, the carbon fiber is not sufficiently entangled with the PTFE and falling of the carbon fiber cannot be prevented. It is noted that the curvature radius is measured by taking secondary electron images using an electron microscope (JSM-5900LV manufactured by JEOL Ltd.) and analyzing the images using an image analysis software (Image-Pro Plus version7.0 manufactured by Media Cybernetics, Inc.).

The curved/twisted carbon fiber selected in this manner is entangled with the PTFE in a curved/twisted part, thus the carbon fiber is hardly fallen off even when a bearing material is softened by sliding heat and reduces carbon fiber holding force.

Specific examples of the curved/twisted carbon fiber available on the market include, as a carbon grade, S-2404N, S249K, and S-241 (manufactured by Osaka Gas Chemicals Co., Ltd.) and the like, and, as a highly graphitized carbon grade, SG-249 and SG-241 (manufactured by Osaka Gas Chemicals Co., Ltd.) and the like.

It is noted that, as the carbon fiber, a PAN-based carbon fiber is commonly used other than the pitch-based carbon fiber, and a PAN-based carbon fiber formed in a curved/twisted shape having the above curvature radius of 50 to 1500 μm may be used in the same manner.

A blending amount (filler ratio) of the curved/twisted carbon fiber is necessarily 18 to 35 wt. %, particularly preferably 20 to 30 wt. %, based on 100 wt. % of the total resin composition. The carbon fiber serves to protect the resin composition from sliding. Thus, when the blending amount is small, the soft resin tends to be exposed and become liable to wear, and when the blending amount is too large, the carbon fiber is hardly held by the resin.

When the blending amount of the CF is less than 20 wt. %, wear resistance of the resin composition is reduced and when the blending amount of the CF is more than 35 wt. %, cracks are generated. Accordingly, both cases are not preferable.

From the above, the blending amount of the carbon fiber in the total resin composition is 18 to 35 wt. %, preferably 20 to 30 wt. %, based on the total resin composition (100 wt. %), and the blending amount of the PFA resin in the total resin composition is 12 to 25 wt. %, preferably 14 to 20 wt. %, based on the total resin composition (100 wt. %). The remainder corresponds to a blending amount of the PTFE or the modified PTFE.

It is noted that the remainder may include other inevitable materials.

For mixing of the PTFE (modified PTFE) resin and the PFA resin and blending of the carbon fiber in the resin raw material, any blending methods can be adopted as long as three elements, two kinds of resin raw materials and the carbon fiber as a filler, are maintained in a good dispersion state. The blending is commonly performed using a mixer, such as a Henschel mixer and a super mixer. A blending order may be also appropriately set.

As a processing method of the bearing material using the resin composition of the present invention, a common production method of bearing using a CF-containing PTFE (or modified PTFE) resin composition may be applied.

Specifically, the production is performed using such a method in which the above blended product is molded under a pressure of about 70 to 80 MPa, subjected to a heat treatment at about 360 to 390° C. for about 3 hours, and then subjected to a cutting process.

EXAMPLES

The present invention will now be illustrated in greater detail with reference to Examples, but the present invention is not construed as being limited thereto.

The other terms and concepts used in the present invention are based on meanings of the terms conventionally used in the art. Except for the techniques with apparent sources, the various techniques used to carry out the present invention can be easily and consistently performed by one of ordinary skill in the art with reference to published documents and the like. It is noted that "%" in Test Examples represents weight% without exception.

Test Example 1

Measurement of Specific Wear Amount (DRY) Corresponding to Filler Ratio

As a PTFE resin raw material and a carbon fiber (CF), a modified PTFE (NXT70 manufactured by Du Pont-Mitsui Fluorochemicals Co., Ltd.) and a pitch-based, highly graphitized carbon fiber (CF) (SG-249 manufactured by Osaka Gas Chemicals Co., Ltd.) were used, respectively. The blending was performed in such a manner that a blending ratio (filler ratio) of the CF to the PTFE resin was 10%, 15%, 20%, 25%, 30%, 35%, and 40%. The blended product was mixed thoroughly using a Henschel mixer (type: FM20C/I), compression-molded at 60 to 70 MPa, and then fired in a firing furnace at 360 to 390° C. for 3 hours to produce a disk-shaped test piece (outer diameter of 40 mm, thickness of 2 mm).

A sliding characteristics (dynamic friction coefficient) test was performed by measuring a specific wear amount using a ring-on-disk method according to JISK7218A standards. As a counterpart material (ring material), S45C (carbon steel having carbon content of 0.45%) (outer diameter of 25.6 mm, inner diameter of 20 mm, height of 2 mm) was used. Then, the disk-shaped test piece was rotated at a speed of 0.5 m/s for 24 hours under a pressure of 0.8 MPa in a dry condition.

As a result, it was found that when the blending ratio (filler ratio) of the CF was about 18 to 33%, particularly in a range of 20 to 30%, the test piece had a low specific wear amount and exhibited excellent sliding characteristics (FIG. 1).

Test Example 2

Measurement of Specific Wear Amount (DRY) Corresponding to PFA Blending Ratio

Based on the result of Test Example 1, the filler ratio of the CF to the PTFE resin was fixed at 25%, and the sliding characteristics test was performed as in Test Example 1 by measuring a specific wear amount while changing a blending ratio of modified PTFE and a PFA in the PTFE resin raw material.

Specifically, 25% of the pitch-based, highly graphitized CF, which was the same as in Test Example 1, was blended in 75% of the PTFE resin raw material. Of 75% of the PTFE resin raw material, a PFA (ACX21 manufactured by Daikin Industries, Ltd.) was blended in a modified PTFE (NXT70) at a blending ratio of 0%, 10%, 15%, 20%, 25%, 30%, and 35% based on the total resin raw material. Then, a disk-shaped test piece was produced by the same method as in Test Example 1.

Subsequently, a specific wear amount to the counterpart material S45C was measured in a dry condition using the same ring-on-disk method (JISK7218A standards) as in Test Example 1.

Figure 2:
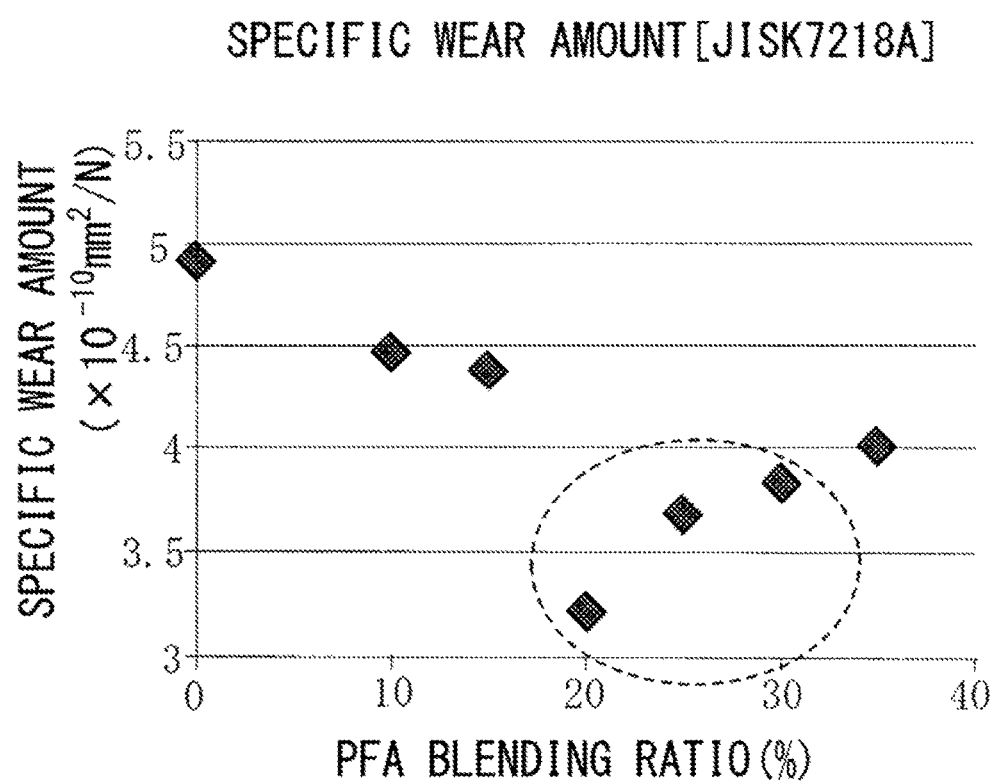
FIG. 2 is a diagram showing measurement results of a specific wear amount (DRY) corresponding to a blending ratio in a resin raw material.

As a result, it was found that when the blending ratio of the PFA was about 18 to 35%, particularly in a range of 20 to 30%, based on the total resin raw material, the test piece had a low specific wear amount and exhibited excellent sliding characteristics (FIG. 2).

Test Example 3

Measurement of Counterpart Aggressiveness Corresponding to PFA Blending Ratio

Similar to Test Example 2, the filler ratio of the CF was fixed at 25%, and a counterpart aggressiveness test was performed while changing the blending ratio of the modified PTFE and the PFA in the PTFE raw material.

Specifically, similar to Test Example 2, the blending ratio of the PFA in the PTFE resin raw material, which accounted for 75% of the total material, is set to 0%, 10%, 15%, 20%, 25%, and 30% based on the total resin raw material. Then, a disk-shaped test piece was produced by the same method as in Test Example 1.

Subsequently, a counterpart aggressiveness test was performed by measuring a change rate (%) of Rz (ten-point average roughness) of the counterpart material in a dry condition for each test piece having a different PFA blending ratio according to JIS0601-1976 standards related to surface roughness.

As the counterpart material, the same carbon steel S45C as in Test Examples 1 and 2 was used. A surface roughness of the counterpart material before test was measured by a stylus-type surface roughness tester according to JIS0601-1976 to calculate Rz. It was RZ1.5 μm.

In the test, as in Test Examples 1 and 2, each disk-shaped test piece was rotated at a speed of 0.5 m/s for 24 hours under a pressure of 0.8 MPa in a dry condition to measure a RZ value. This RZ value was compared to the RZ1.5 μm before test to calculate a change rate (%) of counterpart roughness.

In this calculation, the change rate (%) of counterpart roughness is given by a minus notation, and, as the value approaches zero, the test sample is evaluated as less aggressiveness.

Figure 3:
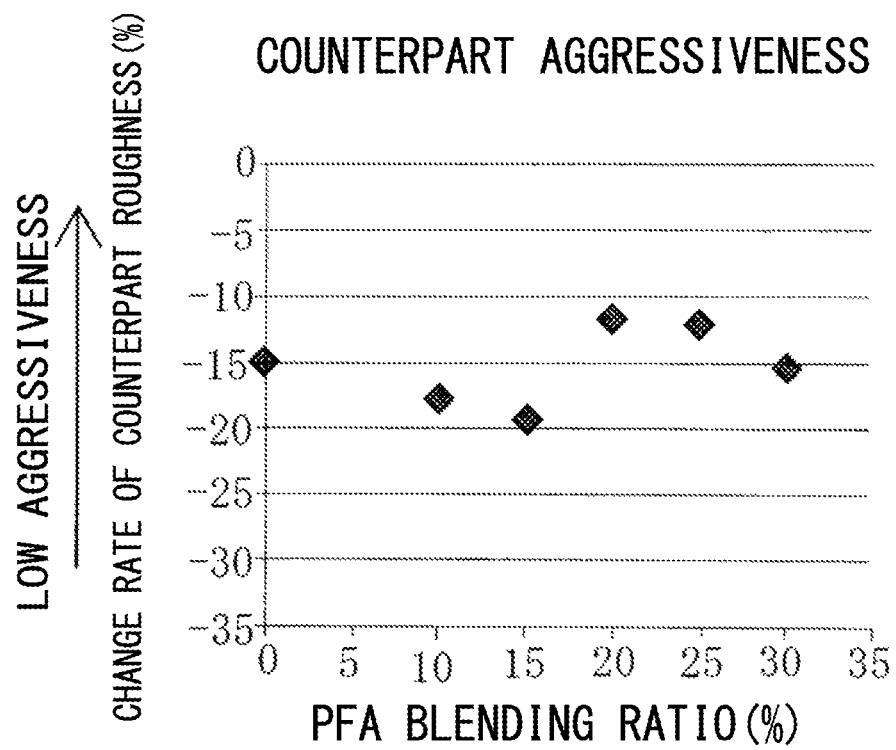
FIG. 3 is a diagram showing measurement results of counterpart aggressiveness corresponding to a blending ratio in a resin raw material.

As a result, it was found that the test samples having the PFA blending ratio of about 18 to 30%, particularly 20 to 25%, have low aggressiveness (FIG. 3).

By combining the results in Test Example 2 and Test Example 3, it is expected that a PTFE product having excellent sliding characteristics and low counterpart aggressiveness can be produced by setting the blending ratio of the PFA in the total PTFE raw material to about 18 to 30%, particularly 20 to 25%. It is required, from Text Example 1, that an optimum filler ratio of the CF is 18 to 33%, particularly 20 to 30%, thus, the blending ratio of the PFA in the total PTFE product having excellent sliding characteristics and low counterpart aggressiveness is 12 to 25%, preferably 14 to 20%. The PTFE is the remainder of the PFA and the CF, thus their ratio is PFA:CF:PTFE=12 to 25:18 to 33:remainder, preferably PFA:CF:PTFE=14 to 20:20 to 30:remainder.

Test Example 4

Difference in Sliding Heat by Type of Carbon Fiber (CF)

In the present test, in order to select the CF having a lower sliding heat property for blending in the PTFE resin raw material, the filler ratio of the CF to 70% of the PTFE resin was fixed at 30% while changing a type of the CF to be blended. Then, a disk-shaped test piece was produced by the same method as in Test Example 1.

In this test, as the PTFE resin, a PTFE (7J manufactured by Du Pont-Mitsui Fluorochemicals Co., Ltd.) was used and, as the carbon fiber (CF) to be blended, the following pitch-based carbon fibers were used: a straight CF (M2007SA manufactured by KUREHA Corp.); a twisted CF in a carbon grade (S-2404N, S249K, and S-241 manufactured by Osaka Gas Chemicals Co., Ltd.); and a twisted CF in a highly graphitized carbon grade (SG-249 and SG-241 manufactured by Osaka Gas Chemicals Co., Ltd.).

Figure 4:
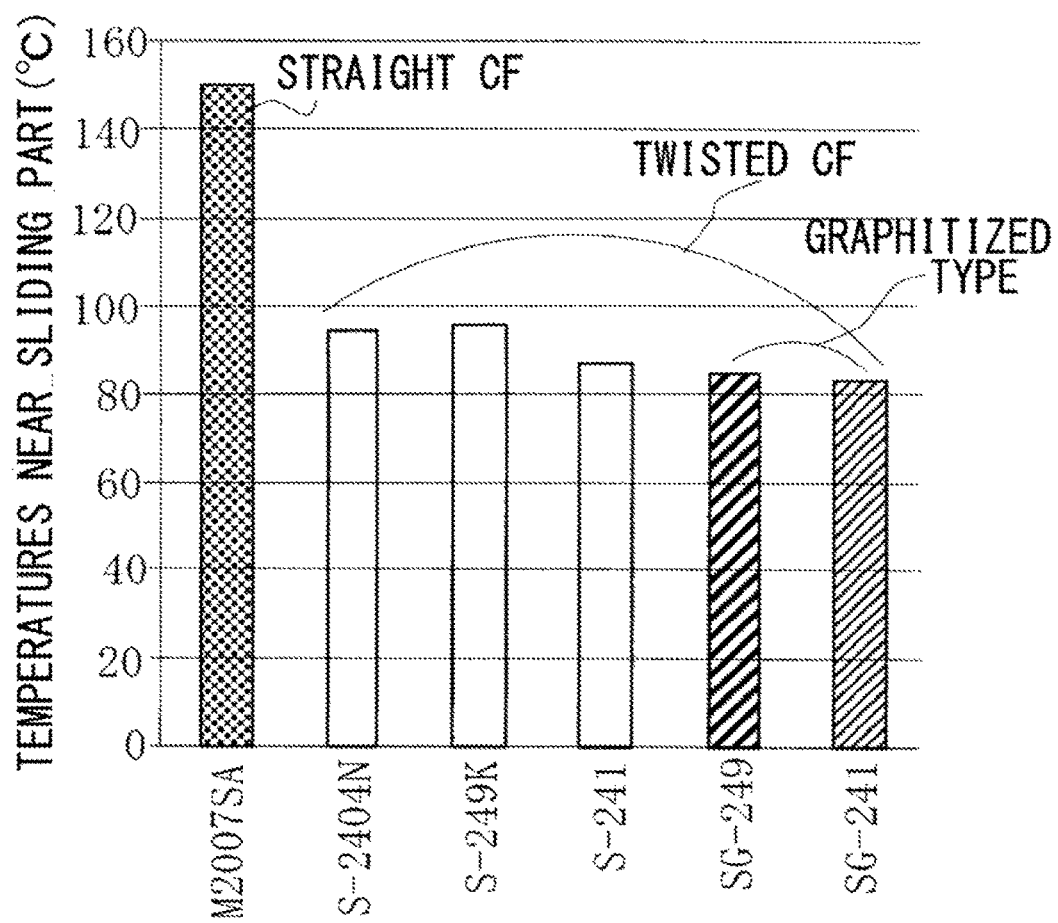
FIG. 4 is a diagram showing measurement results of a sliding heat quantity caused by a difference in a shape of blended carbon fiber.

In a sliding heat test, as in Test Examples 1 to 3, a disk-shaped test piece was rotated at a speed of 0.5 m/s for 24 hours under a pressure of 0.8 MPa in a dry condition using the carbon steel S45C as a counterpart material to measure a temperature near a sliding part (FIG. 4). It is noted that the sliding test was performed after adjusting a temperature near a sliding part to a room temperature (25° C.)

As a result, it was found that, among the pitch-based carbon fibers (CFs), the straight carbon fiber caused the temperature near a sliding part to go up to about 150° C. and was unable to be used due to high sliding heat, while the twisted CFs could suppress sliding heat to be less than 100° C. and be sufficiently used. In particular, it was found that using the highly graphitized CF caused low sliding heat and was thus more preferable.

Example 1

Fifty five pts.wt of a modified PTFE (NXT70 manufactured by Du Pont-Mitsui Fluorochemicals Co., Ltd.), 20 pts.wt of a PFA (ACX21 manufactured by Daikin Industries, Ltd.), and 25 pts.wt of a pitch-based, curved/twisted carbon fiber (S-249 manufactured by Osaka Gas Chemicals Co., Ltd.; average fiber diameter of 13 μm, average fiber length of 90 μm) were mixed using a Henschel mixer (type: FM20C/I), compression-molded at 60 to 70 MPa by pressing and the like, and then fired in a firing furnace at 360 to 390° C. for 3 hours.

Subsequently, the fired product was cut to produce an NZ-7280 type bearing for test. The bearing was subjected to a functional characteristic evaluation test for bearing by performing a bearing operation for 168 hours and evaluated according to the following product evaluation criteria.
<Evaluation Criteria>
1: Wear resistance:

A wear amount of a sliding surface of the bearing after test was measured according to ISK7214K standards and evaluated by the following criteria: ◎ if the specific wear amount is less than $2.0 \times 10^{-12}$ mm$^2$/N, ○ if it is 2.0 to $4.0 \times 10^{-12}$ mm$^2$/N, and X if it is more than $4.0 \times 10^{-12}$ mm$^2$/N.
2: Cracking of product:

Cracking in the test product was visually inspected after the bearing operation and the "presence of cracking" was confirmed if a crack was observed.

These evaluation results are shown in the following (Table 1).

Example 2

A bearing was produced and used as in Example 1 except that the amounts of the modified PTFE, the PFA, and the pitch-based, curved/twisted carbon fiber were changed to 65 pts.wt, 20 pts.wt, and 15 pts.wt, respectively.

These evaluation results are shown in the following (Table 1).

Example 3

A bearing was produced and used as in Example 1 except that the amounts of the modified PTFE, the PFA, and the pitch-based, curved/twisted carbon fiber were changed to 60 pts.wt, 15 pts.wt, and 25 pts.wt, respectively.

These evaluation results are shown in the following (Table 1).

Comparative Example 1

A bearing was produced and used as in Example 1 except that the amounts of the modified PTFE, the PFA, and the pitch-based, curved/twisted carbon fiber were changed to 45 pts.wt, 20 pts.wt, and 35 pts.wt, respectively.

These evaluation results are shown in the following (Table 1).

Comparative Example 2

A bearing was produced and used as in Example 1 except that the amounts of the modified PTFE, the PFA, and the pitch-based, curved/twisted carbon fiber were changed to 45 pts.wt, 30 pts.wt, and 25 pts.wt, respectively.

These evaluation results are shown in the following (Table 1).

Comparative Example 3

A bearing was produced and used as in Example 1 except that the amounts of the modified PTFE and the pitch-based, curved/twisted carbon fiber were changed to 75 pts.wt and 25 pts.wt, respectively, without blending the PFA.

These evaluation results are shown in the following (Table 1).

TABLE 1

| | | Examples | | | Comparative Examples | | |
|---|---|---|---|---|---|---|---|
| Blending ratio | | 1 | 2 | 3 | 1 | 2 | 3 |
| PTFE (pts. wt) | | 55 | 65 | 60 | 45 | 45 | 75 |
| PFA (pts. wt) | | 20 | 20 | 15 | 20 | 30 | — |
| CF (pts. wt) | | 25 | 15 | 25 | 35 | 25 | 25 |
| Evaluation criteria | Wear resistance | ◎ | ○ | ○ | ◎ | X | X |
| | Cracking of product | No | No | No | Yes | No | No |

From the above results, it was confirmed that, when the blending ration of the CF exceeded 35 pts.wt in the total composition (100 pts.wt), cracking of the product occurred, which was not preferable, further when the blending ration of the PFA resin exceeded 30 pts.wt, wear resistance was deteriorated.

The invention claimed is:
1. A water lubrication type bearing material comprising:
   12 wt. % to 25 wt. % of a tetrafluoroethylene-perfluoroalkyl vinyl ether copolymer resin (PFA resin);
   18 wt. % to 33 wt. % of a carbon fiber; and
   42 wt. % to 70 wt. % of a remainder including a polytetrafluoroethylene (PTFE) resin and/or a modified PTFE resin,
   wherein the carbon fiber is a curved/twisted carbon fiber having a curvature radius in a range of 50 to 1500 μm, and
   no solid lubricant is blended in the water lubrication type bearing material.
2. The water lubrication type bearing material according to claim 1, wherein the carbon fiber is a pitch-based carbon fiber.
3. The water lubrication type bearing material according to claim 1, wherein a length of the carbon fiber is 70 to 200 μm.
4. The water lubrication type bearing material according to claim 1, being used as a bearing for water circulation type seal system of ship.
5. The water lubrication type bearing material according to claim 1, wherein the modified PTFE is a copolymer of tetrafluoroethylene and an unsaturated compound selected from a group consisting of fluoroalkyl trifluoroethylene, ethylene, and propylene.
6. The water lubrication type bearing material according to claim 1, wherein the PFA has a melt flow rate value (MFR) of less than 15 g/10 min in accordance with ASTMD3307.
7. The water lubrication type bearing material according to claim 1, being arranged inside a metallic member.

8. The water lubrication type bearing material according to claim 2, wherein a length of the carbon fiber is 70 to 200 µm.

9. The water lubrication type bearing material according to claim 2, being used as a bearing for water circulation type seal system of ship.

10. The water lubrication type bearing material according to claim 2, wherein the modified PTFE is a copolymer of tetrafluoroethylene and an unsaturated compound selected from a group consisting of fluoroalkyl trifluoroethylene, ethylene, and propylene.

11. The water lubrication type bearing material according to claim 2, wherein the PFA has a melt flow rate value (MFR) of less than 15 g/10 min in accordance with ASTMD3307.

12. The water lubrication type bearing material according to claim 2, being arranged inside a metallic member.

13. The water lubrication type bearing material according to claim 1, wherein the remainder is the PTFE resin and/or the modified PTFE resin, wherein blending amounts of the PFA resin, the carbon fiber, and the remainder are 14 wet. % to 20 wt. %, 20 wt. % to 30 wt. %, and 50 wt. % to 66 wt. %, respectively.

14. The water lubrication type bearing material according to claim 1, wherein a molecular weight of the PTFE resin and/or the modified PTFE resin is 500,000 to 3,000,000.

* * * * *